United States Patent [19]

Horiuchi

[11] Patent Number: 5,405,465
[45] Date of Patent: Apr. 11, 1995

[54] METHOD OF MAKING A MAGNETIC TOY FISH

[75] Inventor: Shigeyuki Horiuchi, Koshigaya, Japan

[73] Assignee: Masudaya Corporation, Tokyo, Japan

[21] Appl. No.: 136,016

[22] Filed: Oct. 14, 1993

Related U.S. Application Data

[63] Continuation-in-part of Ser. No. 41,566, Apr. 2, 1993, Pat. No. 5,301,444.

[51] Int. Cl.⁶ .............................................. B32B 31/16
[52] U.S. Cl. ................................. 156/73.1; 156/292; 472/67; 446/134; 40/426
[58] Field of Search .................... 156/73.1, 290, 292; 446/129, 131, 132, 133, 134, 135, 136; 273/456; 472/67; 40/426

[56] References Cited

U.S. PATENT DOCUMENTS

| | | | |
|---|---|---|---|
| 2,509,785 | 5/1950 | Rubin | 446/139 |
| 3,239,956 | 3/1966 | Canonica, Jr. | 446/134 X |
| 4,432,544 | 2/1984 | Wakimura | 446/136 X |
| 4,726,480 | 2/1988 | Hagen | 156/73.1 X |
| 4,726,481 | 2/1988 | Hagen | 156/73.1 X |
| 4,838,964 | 6/1989 | Thompson et al. | 156/73.1 |
| 4,897,134 | 1/1990 | Doering | 156/73.1 |
| 5,050,876 | 9/1991 | Chuang | 446/134 X |
| 5,301,444 | 4/1994 | Horiuchi | 40/426 |

*Primary Examiner*—David A. Simmons
*Assistant Examiner*—J. Sells

[57] ABSTRACT

A method is provided for making a magnetic toy fish. The method comprises conformally joining two premolded plastic half-shell sections containing a magnetic member and a counterweight, and applying sonar energy across the joints to permanently join the half-shell sections together and form the fish.

12 Claims, 3 Drawing Sheets

5,405,465

METHOD OF MAKING A MAGNETIC TOY FISH

This application is a continuation-in-part of application Ser. No. 08/041,566, filed Apr. 2, 1993, now U.S. Pat. No. 5,301,444.

FIELD OF THE INVENTION

This invention relates generally to toy fish of the type used in marine display devices, and is particularly related to magnetic toy fish which may be freely suspended in a liquid medium, and which may be activated to simulate the swimming patterns of a natural fish in a liquid habitat. More specifically, this invention is concerned with a method of making a magnetic toy fish which is buoyant, and which exhibits structural integrity without deterioration or disintegration due to prolonged use of the fish.

BACKGROUND OF THE INVENTION

In the aforementioned copending application Ser. No. 08/041,566, there is described a marine display device which is filled with water and which comprises a magnetic toy fish freely suspended in the water and moves about therein, much in the same way a natural fish swims in an aquatic habitat. The swimming pattern of the magnetic toy fish described in said application is facilitated and controlled by one or more rotatable magnets conveniently disposed in the display device to interact with magnets in the toy fish thereby producing different magnetic fields with corresponding different swimming patterns of the toy fish in the liquid. The toy fish disclosed is said application is formed by adhesively bonding together two half shells molded of a suitable synthetic resin. The toy fish also comprises an air vessel such as a blow molded float which acts as an air bladder in order to impart buoyancy to the toy fish. Also disposed within the toy fish, below the air bladder is a magnet which, together with the air bladder, are so constructed and arranged as to provide proper balance between buoyancy of the air bladder and the weight of the magnet in the toy fish in order to insure that the fish remain freely suspended in the liquid at all times.

Magnetic toy fishes are not new and have been known for some time. One such toy fish, for example, has been described in U.S. Pat. No. 2,509,785. The fish described therein comprises a buoyant means placed above the horizontal axis of the fish body so that when the fish is placed in water, it can float upright. The fish body is stamped from a thin plastic sheet and a magnetic rivet member is affixed to the upper body of the fish so that the fish can be moved by magnetic means.

Another magnetic toy fish is described in U.S. Pat. No. 3,239,956. This patent describes a marine display apparatus in which an animated toy fish containing a countermagnet is freely suspended in a liquid medium and is caused to move about in the liquid in an attempt to simulate the movements of a natural fish in an aquatic habitat. The fish 24 described in that patent is constructed of molded plastic material made in two sections such as the half-shells 24a and 24b which are secured together by water-resistant glue. The fish 24 is provided internally with a bulb 28 having a pocket 32 in which a magnet 34 is secured.

More recently, a magnetic toy fish of different construction was described in U.S. Pat. No. 5,050,876.

A major deficiency of the toy fish constructed by the prior art methods is that the half-shell sections which form the fish tend to separate and come apart due to the degradation or deterioration of the glue or adhesive used to bond the half-shell sections together. Thus, after its use in a marine display, the toy fish tends to come apart, and thus it can no longer be used as a toy fish.

Therefore, it is an object of this invention to provide a toy fish which exhibits structural integrity along its joints and which is capable of retaining its buoyancy and remain in free suspension in the liquid medium indefinitely.

It is a further object of this invention to provide a magnetic such toy fish which can retain its buoyancy and remain in free suspension in a liquid medium while it is magnetically actuated to simulate the swimming action of a natural fish in its liquid habitat.

It is also an object of this invention to provide a unique method of making a toy fish, including a magnetic toy fish.

It is yet another object of this invention to provide a unique method of making a toy fish, including a magnetic toy fish by the application of sonar energy to weld and seal the half-shell sections used to form the fish.

It is still an object of this invention to provide a method of making a toy fish which does not require the use of glue or adhesive for bonding the half shells which form the fish body.

The foregoing and other objects and features of the present invention will become more apparent from the following detailed description of the invention and reference to the accompanying drawings.

SUMMARY OF THE INVENTION

In accordance with the method of this invention, two premolded half-shell sections are conformally joined together and sonar energy is applied across the joints in order to seal these joints and form the fish. The sonar energy is applied across the joints for a period of time sufficient to seal the joints together. Thereafter, the application of sonar energy is discontinued and the resulting joined half-shall sections are firmly held together in order to achieve a permanent bond.

BRIEF DESCRIPTION OF THE DRAWINGS

In the drawings, wherein like reference numerals are employed to designate like parts.

DETAILED DESCRIPTION OF THE INVENTION

Figure 1:
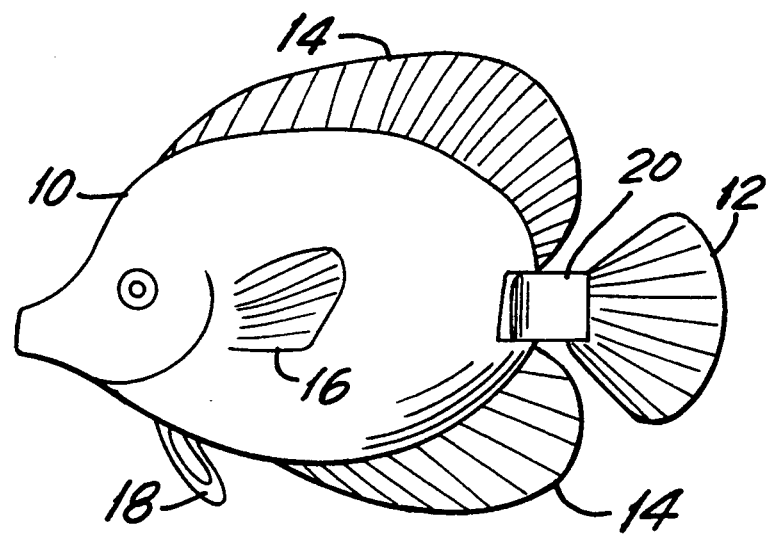
FIG. 1 is an elevational side view of a toy fish constructed in accordance with the method of the inventor.

Referring to FIG. 1, there is shown a toy fish generally designated as 10 constructed of two half-shell sections 10a and 10b which are sealed together by sonar welding in accordance with the method of this invention as hereinafter described in detail. Each of the half-shell sections is preferably molded of a sonar-sealable plastic such as, for example, The toy fish 10 also comprises the tail fin 12, the integral dorsal fins 14, the integral pectoral fins 16 and the pelvic fins 18. The tail fin 12 includes the integral boss 20 which is hingedly mounted on the hinge pin 22 as is more particularly shown in FIG. 2. Thus, the tail fin 12 waggles freely about the hinge pin 22 as the toy fish swims in the liquid.

The interior of the half shell 10a comprises a generally rectangular compartment 24a axially disposed therein for retaining a generally cylindrical magnetic member 26. The compartment 24a is open on one side (the side facing the interior of the half-shell section 10b) and is sized to insert the cylindrical magnetic member 26 partly therein, with the other part of the cylindrical magnetic member 26 being fitted into a correspondingly shaped compartment 24b disposed in the half-shell section 10b. The half-shell section 24a also contains, interiorly, a pair of circular compartments 30 and 32 each retaining a counterweight 34 and 36, respectively. Each compartment 30, 32 is dimensioned so as to retain its respective counterweight 34, 36, with part of each counterweight protruding beyond the open surface of its respective compartment, the protruded section of each counterweight being inserted in the compartments 38, 40, each of which mates with its facing compartments 30, 32 correspondingly, to define an enclosure for each of the counterweights 34, 36.

After the half-shell sections 10a and 10b have been joined and the magnetic member 26 and the counterweights 34, 36 inserted in their respective compartments, the half-shell sections must be secured to each other so as to form the toy fish. In forming the toy fish, it is of course of paramount importance for prolonged use of the fish that the two half-shell sections be permanently secured so as to retain the mechanical integrity of the toy fish and prevent separation of the half-shells due to deterioration or disintegration of the joints. The adhesives and glues heretofore used to secure the half-shell sections together have not been entirely satisfactory and tend to weaken or deteriorate with time, especially upon prolonged use in water. Accordingly, it is necessary to seal the half-shell sections by means which will insure the permanency of the joints and prevent their deterioration.

After extensive research, the present inventor has discovered that when the half-shell sections are sealed together by the application of sonar energy, the resulting toy fish exhibits remarkable mechanical integrity along its sealed joints, and these joints remain permanently adhered to each other with no separation or deterioration.

In accordance with the method of this invention, the toy fish is formed by bringing preformed (molded) two half-shell sections into alignment with each other in a customized sonar machine, and applying sonar energy across their joints, thereto at a frequency of from about 18,000 Hz to about 24,000 Hz, preferably from about 19,000 Hz to about 20,000 Hz; a pressure of from about 15 p.s.i. to about 20 p.s.i., preferably from about 17 p.s.i. to about 18 p.s.i.; welding (sealing) time of from about 0.5 second to about 0.9 second, preferably from about 0.6 second to about 0.8 second, and a holding time of from about 1.0 second to about 2.0 seconds, preferably from about 1.4 second to about 1.5 second.

Sonar welding may be carried out at ambient temperatures but preferably this temperature is few degrees below the melting point of the plastic used to form the half-shell sections. For example for ABS (acrylonitrile-butadiene-styrene) resin which has a melting point of about 210° F. to about 230° F. (depending on the resin composition) the sonar welding temperature should be slightly below its melting point. Naturally this temperature will vary when other plastics are used to form the half-shell sections.

Sonar welding equipments are generally known in the art and may be custom made and tooled for the purpose of this invention.

"Welding time" as used herein means the actual time it takes for the sonar waves to penetrate through the half-shell sections along the joints to be sealed, and "holding time" refers to the time necessary, after welding, in order to perfect and stabilize the seal between the joints.

Thus, as it can be seen from the foregoing description, the half-shell sections are brought together and are subjected to sonar welding at the aforementioned conditions. After welding has been completed as aforesaid, the application of sonar energy is discontinued and the toy fish is held together, such as by clamping at the sealed joints, for the holding time specified above to perfect the seal.

The method of this invention does not require the use of glue or adhesive, and the toy fish constructed by this method exhibits remarkable seal strength and mechanical integrity along their entire joints of the half-shell sections which form the fish body.

Figure 2:
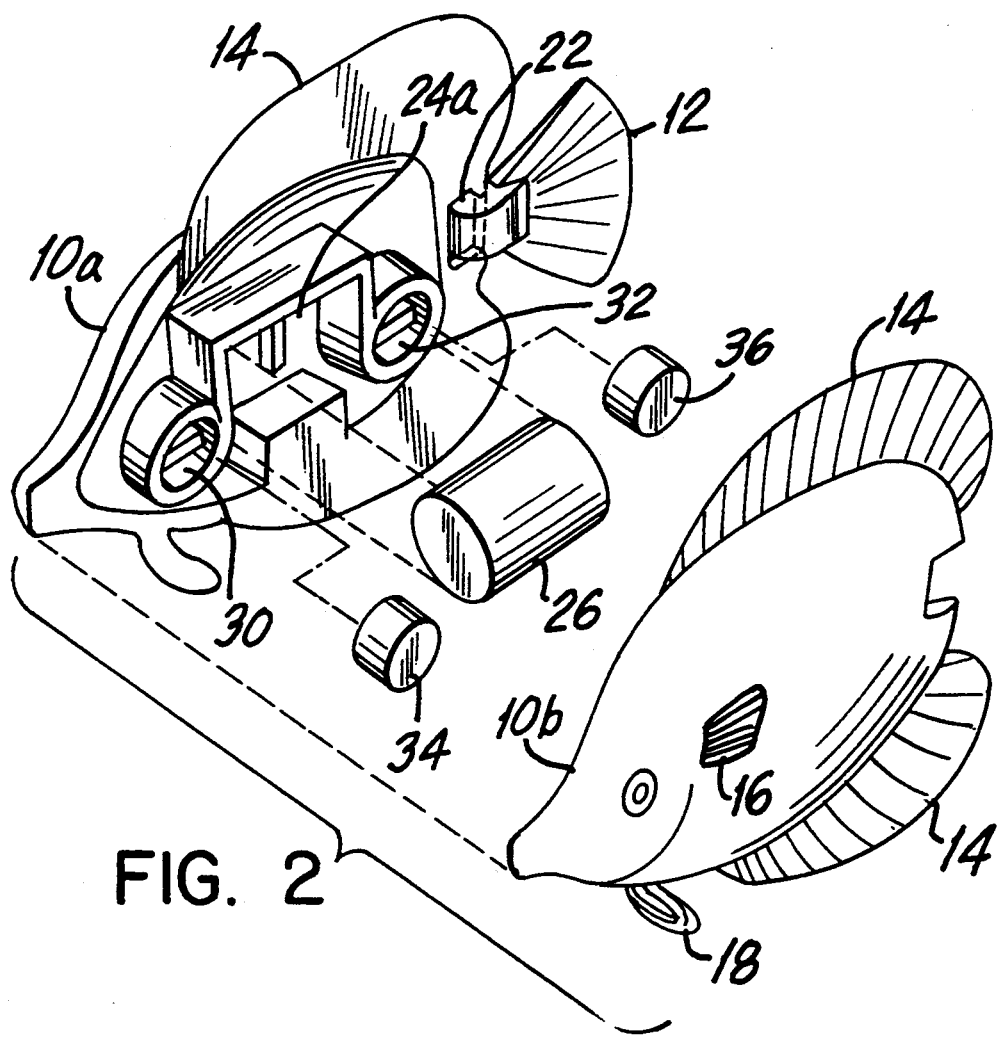
FIG. 2 is an exploded view showing the interior of one of the half shells which form the fish body.
Figure 3:
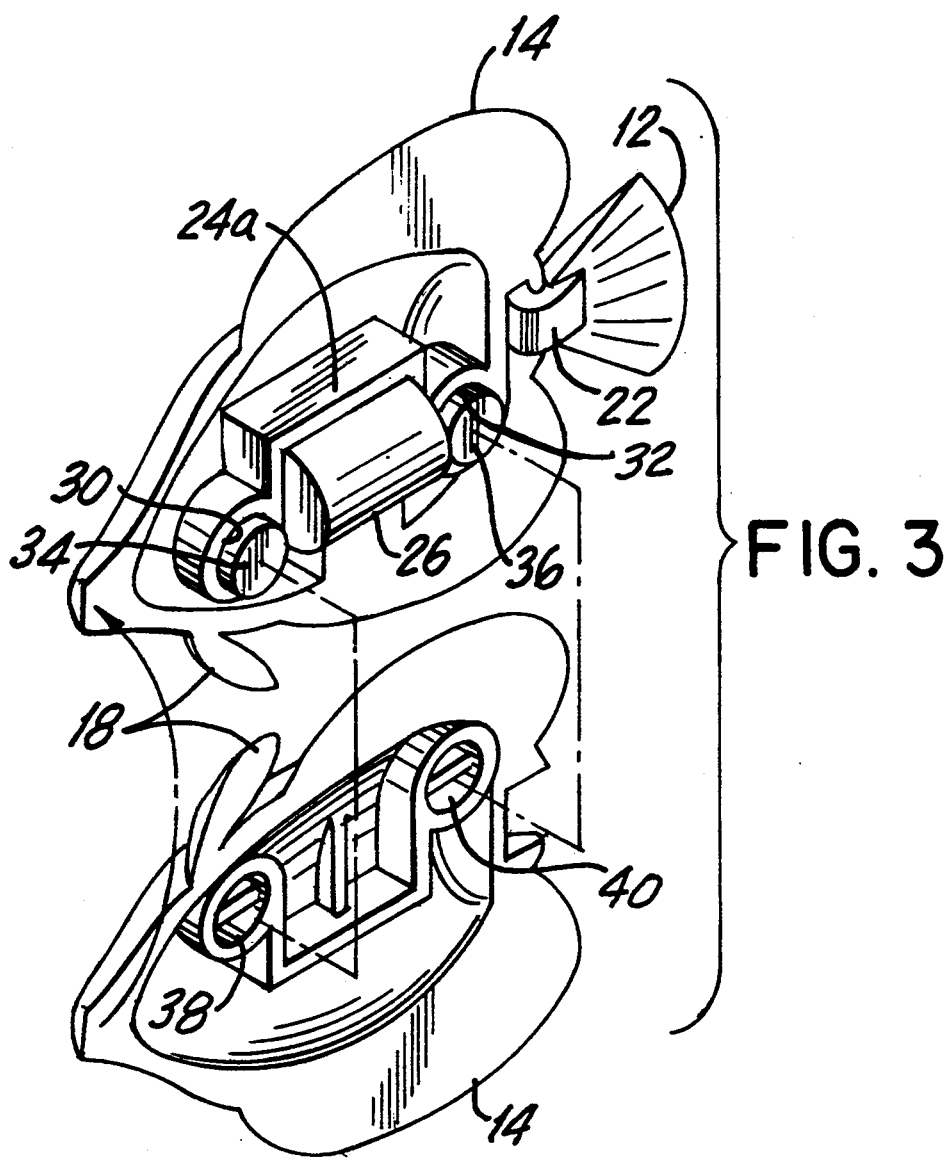
FIG. 3 is a side view of each of the half shells forming the fish body, showing the interior of each half shell, with one of the half shells rotated 180 degrees in order to illustrate the mating of the interior parts.
Figure 4:
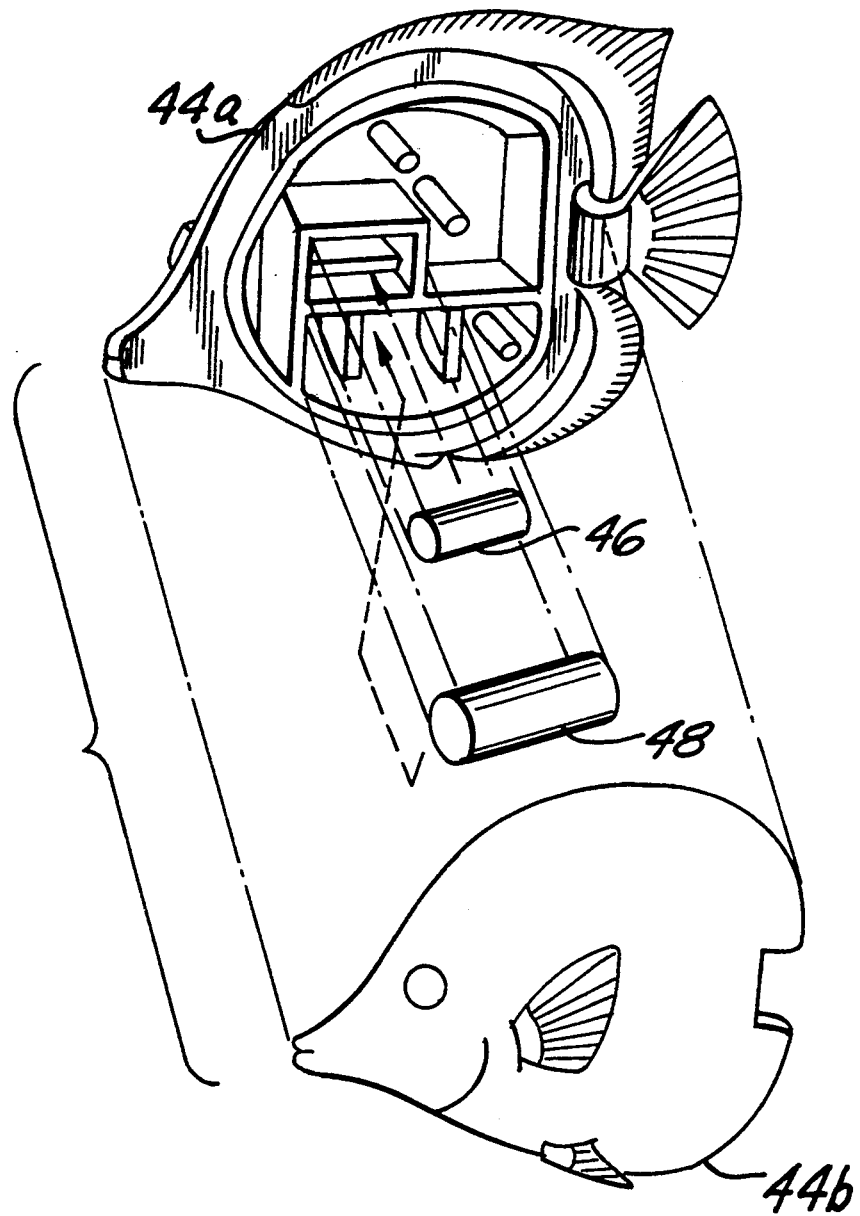
FIG. 4 is a view similar to FIG. 2 but having different relative positions of the magnetic member and the counterweight.

While the toy fish illustrated and described is FIGS. 1–3 show that the fish comprises one magnetic member and two counterweights on each side of this member, another variation of the toy fish comprises a magnetic member and a balancing weight disposed underneath the magnetic member. Such variation is shown in FIG. 4. As shown in this figure, the toy fish comprises two half-shell sections 44a and 44b. Each of these half-shell sections is similar in construction to the half-shell sections 10a and 10b except that internally they comprise a magnetic member 46 and a counterweight 48 which is disposed below the magnetic member 46. The counterweight 48 and the magnetic member 26 are sized to fit into their respective compartments in the half-shall sections 44a, 44b much in the same way it was described in connection with FIGS. 1–3.

Other variations in the toy fish structure suggest themselves from the foregoing detailed description and are, therefore, encompassed within the scope of this invention.

What is claimed is:

1. A method of constructing a toy fish formed from two preformed half-shell sections with each half-shell section defining one half of the fish structure, which comprises: bringing said preformed half-shell sections into alignment with each other, sealing said two preformed half-shell sections to form air tight seal joints, said sealing being carried out by applying sonar energy to the half-shell sections across their entire lengths, at a frequency of from about 18,000 Hz to about 20,000 Hz, a pressure of from about 15 p.s.i. to about 20 p.s.i., and a welding time of from about 0.5 second to about 0.9 second to effect the air-tight seal between said half-shell sections.

2. A method as in claim 1 and including the further step of discontinuing the application of sonar energy and holding the sealed sections together for a period of from about 1.0 second to about 2.0 second.

3. A method as in claim 1 wherein each of said half-shells is made of a sonar-sealable plastic.

4. A method as in claim 2 wherein each of said half-shells is made of a sonar-sealable plastic.

5. A method as in claim 3 wherein each of said sonar-sealable plastic is acrylonitrile-butadiene-styrene resin.

6. A method as in claim 4 wherein each of said sonar-sealable plastic is acrylonitrile-butadiene-styrene resin.

7. A method as in claim 1 wherein said fish comprises a magnetic member and a counterweight.

8. A method as in claim 2 wherein said fish comprises a magnetic member and a counterweight.

9. A method as in claim 3 wherein said fish comprises a magnetic member and a counterweight.

10. A method as in claim 4 wherein said fish comprises a magnetic member and a counterweight.

11. A method as in claim 5 wherein said fish comprises a magnetic member and a counterweight.

12. A method as in claim 6 wherein said fish comprises a magnetic member and a counterweight.

* * * * *